United States Patent [19]

Wisherd

[11] 3,784,932

[45] Jan. 8, 1974

[54] PARALLEL TRANSMISSION LINE MATCHING NETWORK FOR CONNECTING TOGETHER A PLURALITY OF R.F. AMPLIFIER TRANSISTORS

[75] Inventor: David S. Wisherd, Hoffman Estates, Ill.

[73] Assignee: Motorola, Inc., Franklin Park, Ill.

[22] Filed: Dec. 11, 1972

[21] Appl. No.: 313,899

[52] U.S. Cl. ...................... 333/9, 330/30 R, 333/33
[51] Int. Cl. .......................... H01p 5/12, H03h 7/38
[58] Field of Search ................ 330/30 R, 31; 333/8, 333/9, 32, 33

[56] References Cited

UNITED STATES PATENTS 3,477,032 11/1969 Bailey et al. ...................... 330/30 R

*Primary Examiner*—Paul L. Gensler
*Attorney*—Stanley J. Tomsa, Eugene A. Parsons and Vincent Rauner

[57] ABSTRACT

A transmission line matching network for connecting a plurality of RF amplifier transistors together in parallel in a manner to assure substantially symmetrical division of power between the amplifier transistors includes a first plurality of similar transmission line matching networks each connected to one of the amplifier transistors to transform the impedance of each transistor to a predetermined level and a second transmission line matching network connected to each of the first matching networks for matching the impedances of the individual matching networks to that of another transmission line.

11 Claims, 5 Drawing Figures

PARALLEL TRANSMISSION LINE MATCHING NETWORK FOR CONNECTING TOGETHER A PLURALITY OF R.F. AMPLIFIER TRANSISTORS

BACKGROUND

1. Field of Invention

This invention relates generally to transmission lines, and more particularly to strip line transmission lines used as matching networks for connecting radio frequency amplifiers together in parallel.

There are many applications wherein it is necessary to provide a circuit for connecting several radio frequency amplifiers in parallel. One such application for such a network is in the final amplifier stages of a radio frequency transmitter wherein it is necessary to connect several power amplifier transistors in parallel to provide a higher power output than can be achieved from a single power amplifier transistor.

2. Prior Art

Several techniques for providing networks for connecting several radio frequency amplifiers in parallel are known. One such system utilizes a plurality of discrete inductance-capacitance networks for transforming the impedance of the amplifier to a predetermined level. Each of the matching networks has one port connected to one of the radio frequency amplifiers and another port connected to a common signal source or output point. Another such system uses a plurality of transmission line matching networks, each connected to one of the radio frequency amplifiers and to the common signal source or output point.

Whereas these techniques provide a way to achieve a parallel connection for a plurality of radio frequency amplifiers, the first technique requires costly inductors and capacitors, and both techniques become ineffective when more than two radio frequency amplifiers are connected in parallel due to the unequal path length between the signal source or output point and each of the radio frequency amplifiers, thereby causing unequal power division between the amplifiers. In addition, when these techniques are employed to connect the inputs of several radio frequency amplifiers together, the relatively long path length provided by the networks between the inputs of the amplifiers can cause a "push-pull" type of oscillation or regeneration.

SUMMARY

It is an object of the present invention to provide an improved matching circuit for connecting several radio frequency amplifiers in parallel.

It is a further object of this invention to provide a distributed parameter matching circuit for connecting several radio frequency amplifiers in parallel which can be readily fabricated using strip line techniques.

It is another object of this invention to provide a distributed parameter matching network that provides improved power distribution between the individual amplifiers.

A still further object of the invention is to provide a more stable radio frequency power amplifier.

In accordance with a preferred embodiment of the invention, a first matching network including a relatively short length of microstrip transmission line is connected to each of the radio frequency amplifiers to transform the impedance thereof to a first predetermined level. Each of the individual matching networks is connected to a second common matching network including a second length of strip line transmission line for transforming the impedances of the individual matching networks to a desired level compatible with an external source or output. The major transformation is provided by the common matching network, thereby minimizing problems caused by differences in the individual matching networks. In addition, the individual matching networks are designed to partially invert the impedance variations of the individual amplifiers to thereby reduce the power applied to any amplifier that may be dissipating an excessive amount of power.

DETAILED DESCRIPTION

Figure 1:
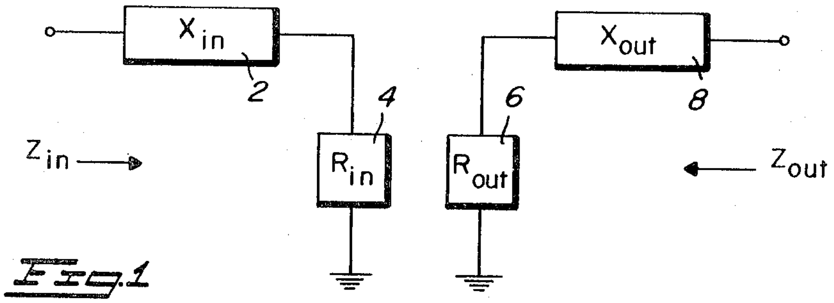
FIG. 1 is a block diagram representation of the input and output impedances of a typical radio frequency power amplifier transistor.

Referring to FIG. 1, there is shown a circuit diagram showing an equivalent circuit of the input and output impedance of a typical UHF power transistor. The input impedance $Z_{in}$ of the transistor is comprised of a real or resistive component $R_{in}$ and a reactive component $X_{in}$, denoted as 4 and 2, respectively. Similarly, the output impedance of a radio frequency power transistor may be represented as a real ($R_{out}$) component 6 and an imaginary ($X_{out}$) component 8. Typically, for UHF power transistors, the input impedance $Z_{in}$=1.5+j5 ohms and $Z_{out}$=1.2+j3 ohms. UHF transistors will be considered for purposes of explanation in the following discussion, however, the circuit of the invention may be used at any frequency at which the physical lengths of the transmission lines do not become excessive.

Figure 2:
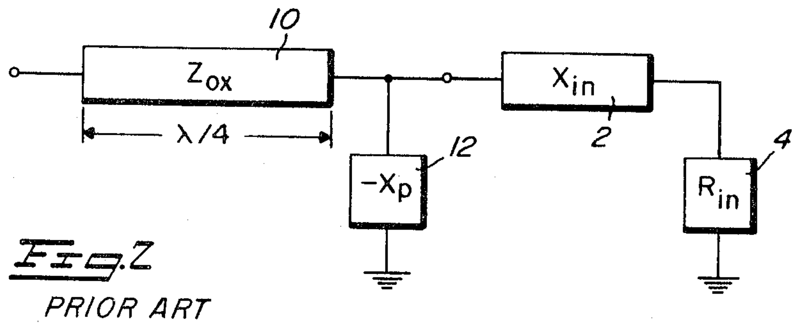
Fig.2 PRIOR ART
FIG. 2 is a block diagram representation of a strip line matching network used to match the input of a single radio frequency amplifier transistor to a signal source having a predetermined output impedance.

As can be seen from the circuit of FIG. 1, the input and output impedances of a typical radio frequency power transistor are quite low. Standard transmission lines which are used to convey radio frequency energy to or from a power transistor generally have a much higher characteristic impedance, typically on the order of 50 ohms. As a result, a matching network must be employed between the radio frequency transistor and the transmission line. FIG. 2 shows a matching network of the type generally used to match the impedance of an external circuit, such as a transmission line, to the input impedance of a power transistor. An input matching circuit is shown for purposes of explanation, however, similar circuits are used for matching to the output of a transistor amplifier. FIG. 2 shows the input circuit of a transistor amplifier represented by the real and reactive components 4 and 2, respectively, of the input impedance of the transistor shown in FIG. 1. The matching network includes a quarter wave transmission line 10 connected in series with the input of the power transistor and a reactive element 12 connected in shunt with the input of the transistor.

The input impedance of the transistor $Z_{in}=R_{in}+jX_{in}$, as represented by the real and reactive components 4 and 2, respectively, may be mathematically converted to equivalent parallel real and reactive impedances by the following relationships:

$$R_p=R_{in}+X_{in}^2/R_{in}$$

$$X_p=X_{in}+R_{in}^2/X_{in}$$

where $R_p$ and $X_p$ are the parallel equivalent real and reactive components, respectively, of the series connected reactances 4 and 2 of FIGS. 1 and 2. The above equations are used to convert the series equivalent resistance and reactance of a transistor to parallel equivalent resistance and reactance. For transistors wherein the parallel equivalent resistance and reactance is specified, the transformation need not be made.

In the matching circuit of FIG. 2, the value of the shunt connected reactance 12 is chosen to be substantially equal to the negative of the parallel equivalent reactive component $X_p$ to cancel the reactive portion of the transistor input impedance. In a typical transistor wherein the parallel equivalent input reactance is equal to $X_p$, the value of the shunt reactance 12 would be equal to $-X_p$. In a typical transistor, the reactive component $X_p$ is inductive and therefore the reactance 12 would be a capacitor having a capacitive reactance substantially equal to the inductive reactance $X_p$ at the frequency of operation of the transistor. The characteristic impedance $Z_{ox}$ of the quarter wave transmission line 10 is selected to be equal to the square root of the product of the equivalent parallel resistance of the transistor $R_p$ and the impedance $Z_o$ of the circuit to which the line 10 is to be connected. This relationship is given by the following well known quarter wave transformer equation:

$$Z_{ox}=\sqrt{R_pZ_o}$$

where $Z_{ox}$ is the characteristic impedance of the line 10. The length of the line 10 is determined by the velocity of propagation of the electromagnetic wave within the line, and is a function of the dielectric material used in the fabrication of the transmission line. Therefore, for purposes of clarity, the length of the transmission lines used in this discussion will be defined in terms of wavelengths in the transmission line material. Thus, a quarter wavelength line will be equal to the length of one quarter of a wavelength of the radio frequency signal as it exists in the transmission line material and at the operating frequency of the amplifier.

Figure 3:
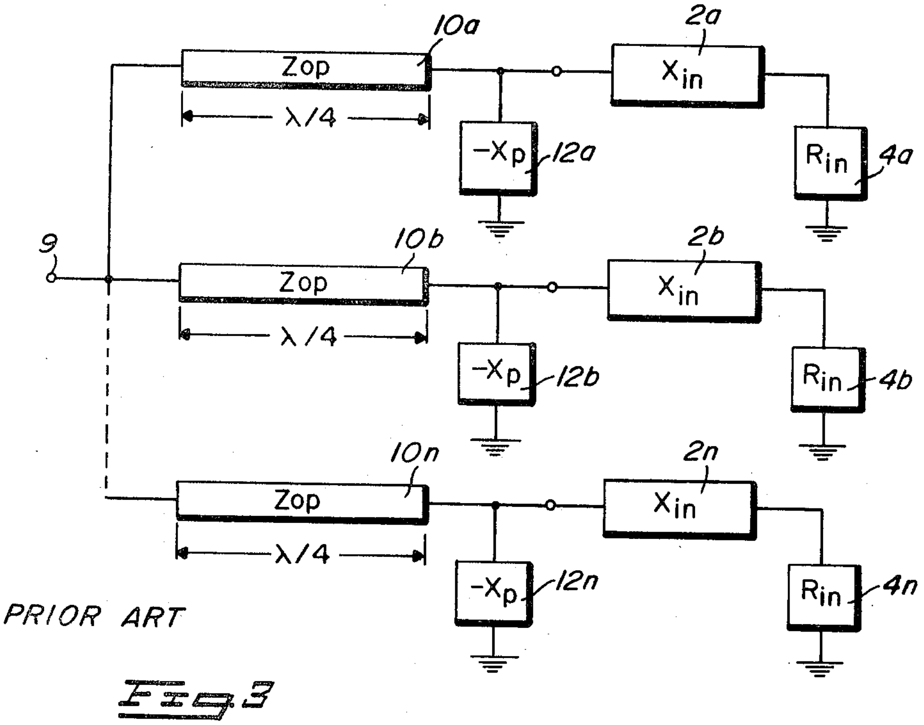
PRIOR ART Fig.3
FIG. 3 shows a block diagram of a prior art matching network for connecting the inputs of several power transistors in parallel.

Referring to FIG. 3, there is shown a prior art circuit for connecting the inputs of several power transistors in parallel. The circuit shows a plurality, n, of power transistors having inputs represented by the real parts 4a through **4*n* and the imaginary parts 2*a* through 2*n*. One of several shunt reactive impedances 12*a* through 12*n* is connected in shunt with the input of each transistor. As in the case of FIG. 2, the value of the shunt impedance is selected to cancel the parallel equivalent reactance of the transistor. A plurality of transmission lines 10*a* through 10*n* each have one end connected to an input point 9 and another end connected to the input of one of the transistors. As in FIG. 2, the length of each of the transmission lines 10*a* through 10*n* is equal to one quarter wavelength, however, the characteristic impedance of each of the lines 10*a* through 10*n* must be equal to the characteristic impedance of the line 10** multiplied by the square root of the number of transistors connected in parallel, and is given by the following form of the quarter wave transformer equation:

$$Z_{op}=\sqrt{nR_pZ_o}=\sqrt{n}Z_{ox}$$

where $Z_{op}$ is the characteristic impedance of each of the lines 10a through 10n and n is equal to the number of lines connected in parallel.

The prior art circuit of FIG. 3 provides a suitable network for connecting two power transistors in parallel, however, when more than two circuits are connected in parallel the path length between the input point 9 and the individual transistors are unequal, thereby causing phase differences between the signals applied to each of the transistors. In addition, the one half wavelength path length between inputs of two parallel transistors can cause a push-pull regeneration or oscillation. Finally, the relatively high value of $Z_{op}$ compared to $Z_{ox}$ requires narrow conductors when the lines **10*a* through 10*n* are fabricated in strip line form, thereby causing masking errors to substantially vary the characteristic impedance of the lines 10*a* through 10*n*.** Also, if any one of the transistors dissipates an excessive amount of power, the prior art circuit will tend to increase the drive to that transistor. Should any of the transistors fail with the input open circuited, which is the most common mode of failure, all of the drive will be applied to the remaining transistors causing them to overdissipate and burn out.

Figure 4:
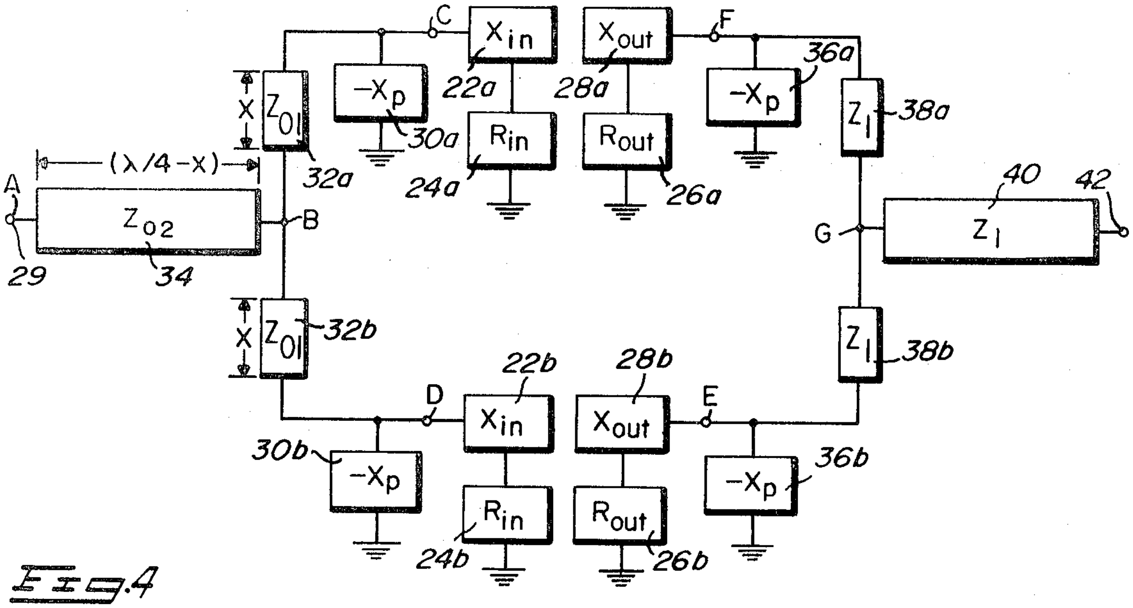
FIG. 4 shows a block diagram of a preferred embodiment of the circuit of the instant invention for connecting the inputs and outputs of two power transistors in parallel.

Referring to FIG. 4, there is shown a block diagram of a matching circuit according to the invention for connecting the inputs and outputs of two radio frequency amplifiers in parallel. The two transistors each have an input impedance comprising real or resistive components **24*a* and 24*b* and reactive components 22*a* and 22*b*. The output impedances of the transistors include resistive components 26*a* and 26*b* and reactive components 28*a* and 28*b*. Reactive circuits 30*a*, 30*b* and 36*a*, 36*b* are connected in shunt with the inputs and outputs of the transistors, respectively, to substantially cancel the equivalent parallel reactances thereof to provide a primarily resistive impedance at points C, D, E and F. In the input circuit, a pair of transmission line segments or sections 32*a* and 32*b* are connected in series between the point B and points C and D, respectively. The characteristic impedance, $Z_{01}$, of each of the lines 32*a* and 32*b* is determined by the same equation used for determining the characteristic impedance $Z_{op}$ of the lines 10*a* through 10*n* of FIG. 3.**

$$Z_{01}=Z_{op}=\sqrt{n}Z_{ox}=\sqrt{nR_pZ_o}=\sqrt{2R_pZ_o}\text{ for two transistors in parallel.}$$

The lengths of each of the line sections 32a and 32b are chosen to be as short as practical to minimize push-pull regeneration, and in the preferred embodiment shown in FIG. 4, the lengths of the lines **32*a* and 32*b* are chosen to transform the impedances 30*a* and 30*b* to substantially 0 ohms at point B. This causes a short circuit to be present at point B in the event that one of the transistors fails and becomes open circuited and thereby prevents the other transistor from being over driven. The length of the transmission line sections 32*a* and 32*b*** required to provide this transformation can be readily determined by means of a Smith chart when the values of the impedances 30*a* and 30*b* are known. For example, when two transistors each having an input impedance of 1.5+*j*5 ohms are to be driven from a 50 ohm source at point A, solving the appropriate equations shows that $Z_{01}$ must be 42.5 ohms, $X_p$ must be *j*5.45 ohms. From a Smith chart, the length of the transmission lines 32*a* and 32*b* required to transform $-X_p$, which is equal to −j5.45 ohms, to zero ohms is equal to 0.02 wavelengths.

The remainder of the transformation from point A to point B is provided by a second transmission line section 34. Although the transmission line 34 is shown as a separate line, it should be noted that the lines 34, 32*a* and 32*b* can be fabricated as separate branches of a single line, particularly when strip lines are employed, and still fall within the scope of the invention. The lines are referred to as separate lines to aid in the explanation of the invention. The characteristic impedance $Z_{02}$ of the line 34 must be equal to one half of the characteristic impedance $Z_{01}$ of each of the lines 32*a* and 32*b*, or 21.25 ohms in the foregoing example. The length of the transmission line section 34 must be selected to provide a quarter wavelength path length between the input point A and each of the points C and D. Since the length x of each of the lines 32*a* and 32*b* is equal to 0.02 wavelengths, the length of the transmission line 34 must be equal to (.25−x) or (0.25−.02)=.23 wavelengths.

It can be seen that the length of the line section 34 is considerably longer than the length of the line sections 32*a* and 32*b* and, therefore, that most of the transformation is provided by the line section 34. Hence, any differences between the line sections 32*a* and 32*b* are not significant to the operation of the system. In addition, the characteristic impedance $Z_{02}$ of the line section 34, which provides the major portion of the transformation, is relatively low. This provides a wide conductor which is fairly immune to mask tolerances when fabricated in strip line form. In addition, the length of the path between points C and D is 2*x* or approximately 0.04 wavelengths, which is short enough to substantially minimize push-pull regeneration. It should be noted that in some cases it may not be possible or desirable to adjust the lengths of the lines 32*a* and 32*b* to transform the impedances 30*a* and 30*b* to zero. However, in these cases, the circuit of the present invention still provides a substantial improvement over the circuits of the prior art by providing a relatively low impedance common line which can be easily fabricated and a short path length between the individual transistors. In cases wherein the lines 32*a* and 32*b* are not used to transform the impedances 30*a* and 30*b* to zero ohms, the lengths of these lines can be made any convenient length. The length of the line 34 is then chosen such that the total length of line 34 and one of the lines 32*a* and 32*b* is equal to one quarter wavelength. The characteristic impedances of all the lines are calculated as before.

The output circuit of the amplifier comprises reactive networks 36*a* and 36*b* which cancel the reactive component of the parallel equivalent output impedance and are analogous in operation to the networks 30*a* and 30*b*. Similarly, the lines 38*a* and 38*b* may be used to transform the impedances 36*a* and 36*b* to substantially zero ohms at point G. The line 40 completes the transformation from point G to the output point 42. The considerations for determining the lengths and characteristic impedances of the lines 38*a*, 38*b* and 40 are similar to the considerations used to determine the lines 32*a*, 32*b* and 34.

Figure 5:
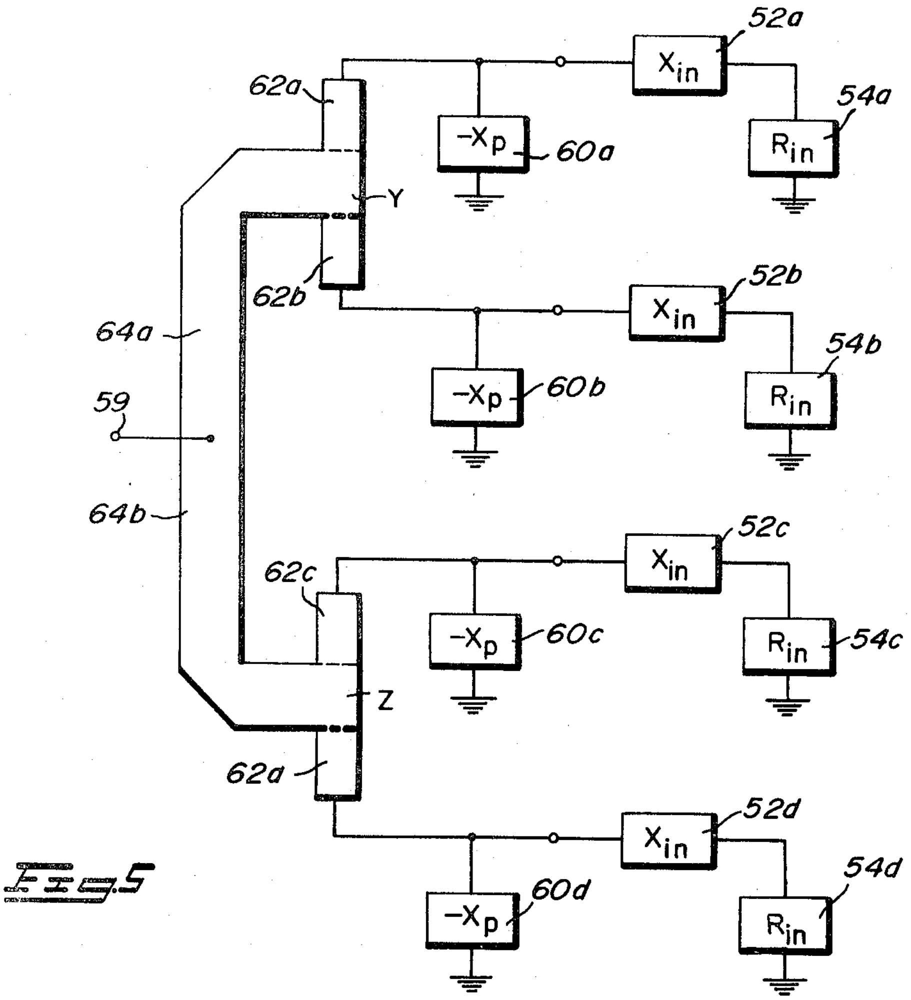
FIG. 5 shows another embodiment of the circuit of the present invention for connecting the inputs of four power amplifiers in parallel.

The circuit of FIG. 5 shows a layout for connecting the inputs of four transistors in parallel. Although not shown for purposes of clarity, a similar system may be employed to connect the outputs of the four transistors in parallel. In the circuit of FIG. 5, the reactances 60*a* through 60*d* are connected to the inputs of the transistors to cancel the equivalent parallel reactance resulting from the input impedances 52*a* and 54*a* through 52*d* and 54*d*, respectively. Four lengths of transmission line 62*a* through 62*d* are used to transform the reactances 60*a* and 60*d* to substantially zero ohms at points Y and Z. Two line segments 64*a* and 64*b* are used to connect the input point 59 to the points Y and Z, respectively. The lines 64*a*, 64*b* and 62*a*–62*d* are depicted as separate branches of a single strip line to illustrate a way in which the lines may be fabricated, however, separate lines may also be used. Since the circuit of FIG. 5 is basically two of the circuits of FIG. 4 connected in parallel, the lengths and the characteristic impedances of the transmission line sections 64*a*, 64*b* and 62*a* through 62*d* must be calculated to match into a 100 ohm load when a 50 ohm driving impedance is connected to the input point 59. This can be done by substituting 100 ohms for $Z_o$, rather than 50 ohms, into the equations defining $Z_{01}$. Thus, when the two line segments 64*a* and 64*b*, which have each been designed to provide a 100 ohm input impedance, are connected together, the resulting parallel combination provides the required 50 ohm input impedance.

The circuit of FIG. 5 is a symmetrical circuit and allows more than two transistors to be connected in parallel with the same path length between the input point 59 and each of the transistors, thereby avoiding the problems of the circuit of FIG. 3. Any number of transistors may be connected in parallel using this technique by simply paralleling branches. For example, eight transistors may be connected in parallel by parallel connecting two circuits each similar to the circuit of FIG. 5.

Although any transmission lines may be used to provide the circuit of the instant invention, the circuit is easily and economically achieved through the use of strip lines wherein the various transmission lines are fabricated by means of copper strips on an alumina substrate. When the lines are thus fabricated the techniques of the present invention, by allowing the use of lower impedance lines, provide better control of the accuracy of the characteristic impedance of each of the lines than could be heretofore achieved by prior art techniques.

I claim:

1. A matching network for operation at a predetermined radio frequency for connecting a predetermined number of first circuits each having a first particular impedance to a second circuit having a second impedance and for transforming said particular impedances to a predetermined impedance matching said second impedance, including in combination:

a plurality of first transmission line sections, the number of said first transmission line sections being equal to the number of said first circuits, each of said transmission line sections having a first end connected to a different one of said first circuits, said first transmission line sections each having a second end, said second ends being connected together, each of said transmission line sections having a first characteristic impedance equal to the square root of the product of the number of said transmission line sections, said first particular impedance and said predetermined impedance; and a common transmission line section having one end connected to the second ends of said first sections and another end connected to said second circuit, said common transmission line section having a second characteristic impedance equal to said first characteristic impedance divided by the number of first transmission line sections connected thereto, the length of said first and second transmission line sections being chosen to provide a quarter wave path length at said predetermined radio frequency between said second circuit and each of said first circuits.

2. A matching network as recited in claim 1 including a second common transmission line section having a pair of ends, one end being connected to said second circuit, and a second plurality of first transmission line sections each having an end connected to the other end of said common transmission line section, each of said second plurality of first transmission line sections having another end connected to an individual one of a second plurality of first circuits.

3. A matching network for operation at a predetermined radio frequency for connecting a predetermined number, greater than one, of radio frequency amplifiers to a second circuit having a second impedance, each radio frequency amplifier having at least first and second terminals with a particular impedance having resistive and reactive components therebetween, and for matching the particular impedances of the radio frequency amplifiers to said second impedance, said network comprising:

a plurality of reactive circuits, the number of reactive circuits being equal to said predetermined number of radio frequency amplifiers, each one of said reactive circuits being connected to both the first and second terminals of only a predetermined different one of the radio frequency amplifiers, each of said reactive circuits having a reactance value chosen to effectively cancel the reactive component of one of said particular impedances to make the resulting combined impedance between each of said first and second terminals substantially equal to said resistive component;

a plurality of first transmission line sections, the number of first transmission line sections being equal to the number of said reactive circuits, each of said first transmission line sections having a first characteristic impedance substantially equal to the square root of the product of the number of said first transmission line sections, said predetermined impedance and said resulting combined impedance, each of said first transmission line sections having a first conductor having a first predetermined length equal to less than one quarter wavelength at said predetermined radio frequency, each first conductor having a first end connected to the first terminal of a different one of said amplifiers and a second end connected to the second end of the first conductor of each of the other of said first transmission lines; and a common transmission line having a second characteristic impedance equal to said first characteristic impedance divided by said number of first transmission line sections connected thereto, said common transmission line having a common conductor having a second length equal to one quarter wavelength at said predetermined radio frequency less than first predetermined length, said common conductor being connected to the junction of said second ends of said first conductors.

4. A matching network as recited in claim 3 including a second common transmission line section having a second common conductor, said second common conductor being connected to said common conductor, and a second plurality of first transmission line sections each connected to said second common conductors.

5. A matching network as recited in claim 3 wherein each of said first predetermined lengths is selected for transforming the reactance of the reactive circuit connected thereto to substantially zero ohms.

6. A matching network as recited in claim 5 wherein said first and common transmission line sections are strip line sections.

7. A matching network as recited in claim 6 wherein the number of first transmission line sections is equal to two.

8. A radio frequency amplifier matching network for operation at a predetermined radio frequency for connection to a circuit having a predetermined impedance, including in combination:

a plurality of transistors each having first and second terminals with a particular impedance including resistive and reactive components therebetween;

a plurality of reactive circuits equal in number to the number of said transistors, each one of said reactive circuits being connected between the first and second terminals of only a predetermined different one of said transistors, each reactive circuit having a reactance value chosen to effectively cancel the reactive component of the transistor connected thereto to provide a substantially resistive resulting combined impedance between said first and second terminals;

a plurality of first transmission line sections equal in number to the number of said reactive circuits, each of said first transmission line sections having a characteristic impedance substantially equal to the square root of the product of the number of first trans-mission line sections, said predetermined impedance and said resulting impedance, each of said first transmission line sections having a first conductor having a first predetermined length less than one quarter wavelength at the predetermined radio frequency, each first conductor having a first end connected to the first terminal of a single one of said tran-sistors and a second end connected to the second end of the first conductor of each of the other first transmission line sections; and a second transmission line section having a second characteristic impedance equal to said first characteristic impedance divided by the number of said first transmission line sections, said second transmission line section having a second conductor having a second length equal to one quarter wavelength at said predetermined radio frequency less said first predetermined length, said second conductor being connected to the second end of the first conductor of each of said first transmission line sections.

9. A radio frequency amplifier matching network as recited in claim 8 wherein each of said first predetermined lengths is selected for transforming the reactance value of the reactive circuit connected thereto to substantially zero ohms.

10. A radio frequency amplifier matching network as recited in claim 9 wherein said transmission line sections are strip line sections.

11. A radio frequency amplifier matching network as recited in claim 10 including a plurality of second transmission line sections each of said second transmission line sections having a second conductor, said second conductors being connected together at one end, and a second plurality of first transmission line sections each connected to the other end of one of said second conductors.

* * * * *